United States Patent
Amiot et al.

(10) Patent No.: US 7,360,989 B2
(45) Date of Patent: Apr. 22, 2008

(54) DEVICE FOR AXIALLY HOLDING A RING SPACER SECTOR OF A HIGH-PRESSURE TURBINE OF A TURBOMACHINE

(75) Inventors: Denis Amiot, Dammarie les Lys (FR); Pascal Lefebvre, Vulaines sur Seine (FR)

(73) Assignee: SNECMA, Paris (FR)

( * ) Notice: Subject to any disclaimer, the term of this patent is extended or adjusted under 35 U.S.C. 154(b) by 553 days.

(21) Appl. No.: 11/070,093

(22) Filed: Mar. 3, 2005

(65) Prior Publication Data
US 2005/0196270 A1 Sep. 8, 2005

(30) Foreign Application Priority Data
Mar. 4, 2004 (FR) .................................. 04 02253

(51) Int. Cl.
*F01D 25/26* (2006.01)
(52) U.S. Cl. ................. 415/138; 415/173.1; 415/173.3
(58) Field of Classification Search ................ 415/115, 415/138, 173.1, 173.3, 173.4, 177
See application file for complete search history.

(56) References Cited

U.S. PATENT DOCUMENTS

| | | | |
|---|---|---|---|
| 4,303,371 A | 12/1981 | Eckert | |
| 4,925,365 A | 5/1990 | Crozet et al. | |
| 5,079,915 A | 1/1992 | Veau | |
| 5,641,267 A | 6/1997 | Proctor et al. | |
| 5,964,575 A * | 10/1999 | Marey | 415/115 |
| 6,139,257 A * | 10/2000 | Proctor et al. | 415/115 |
| 6,200,091 B1 * | 3/2001 | Bromann et al. | 415/173.1 |
| 6,361,273 B1 | 3/2002 | Eng et al. | |
| 6,726,446 B2 * | 4/2004 | Arilla et al. | 415/138 |

FOREIGN PATENT DOCUMENTS

| | | |
|---|---|---|
| EP | 0 555 082 | 8/1993 |
| EP | 1 045 115 | 10/2000 |
| EP | 1 106 785 | 6/2001 |
| EP | 1 225 309 | 7/2002 |

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A device for axially holding a ring spacer sector of a high-pressure turbine of a turbomachine, said spacer sector comprising an upstream radial wall provided with an outer upstream tongue for being engaged in a corresponding upstream groove of a casing of the turbine, and with an inner upstream tongue for being engaged in a corresponding upstream groove of a ring sector, said device comprising a piece of longitudinally-extending sheet metal that constitutes a heat shield disposed upstream from the upstream radial wall of the spacer sector against an inner surface of the casing, the piece of longitudinally-extending sheet metal bearing axially against the upstream radial wall of the spacer sector and being secured to the casing so as to hold the spacer sector axially.

4 Claims, 2 Drawing Sheets

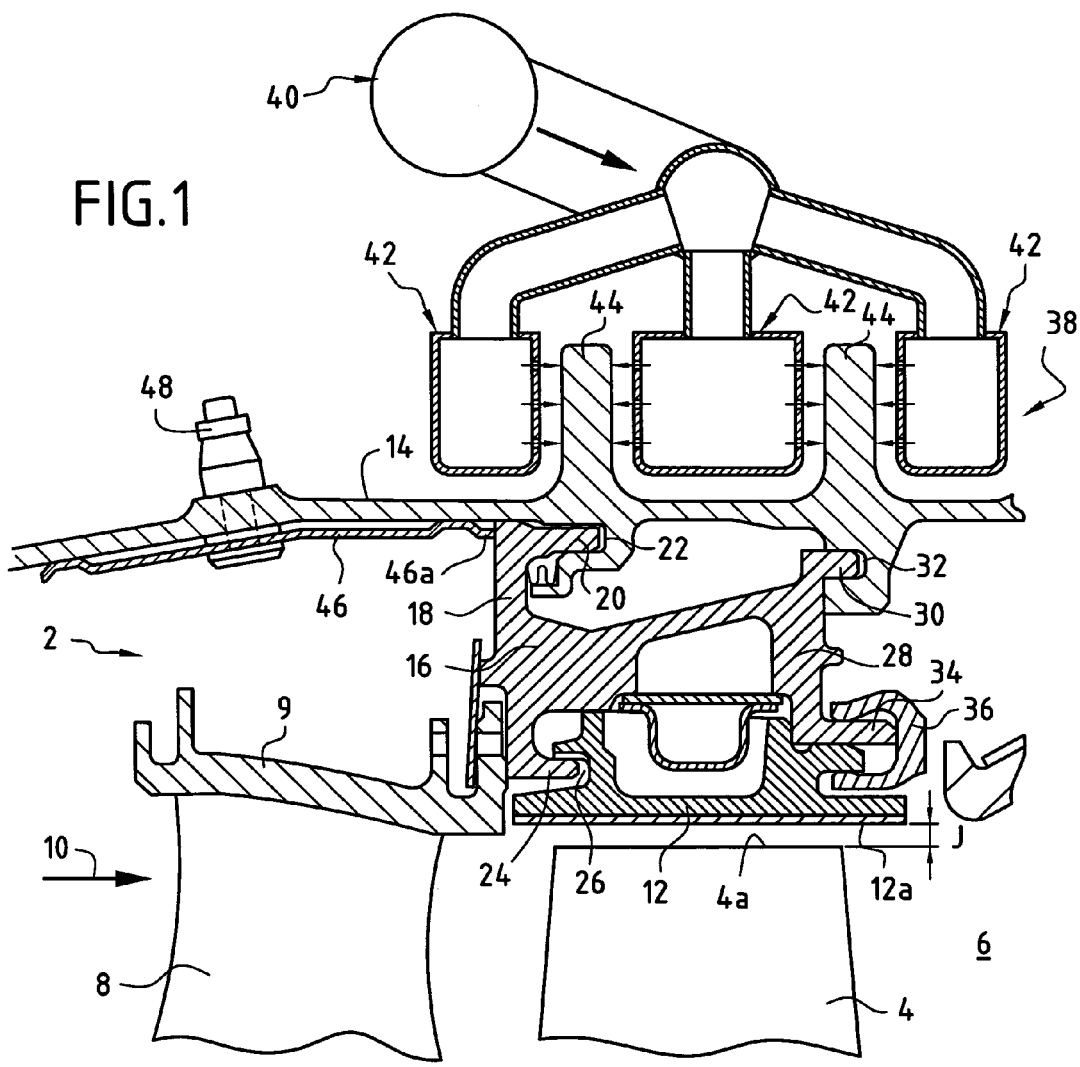
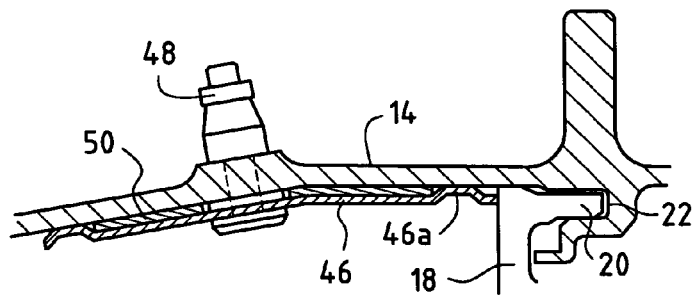

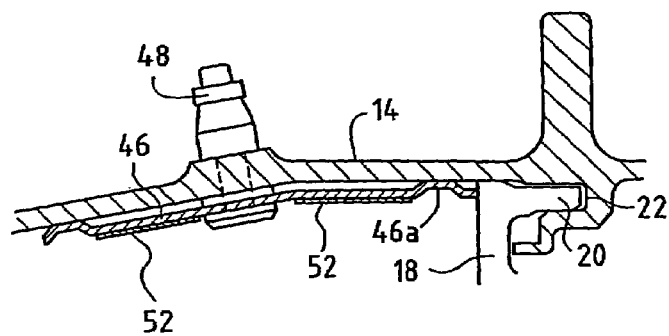
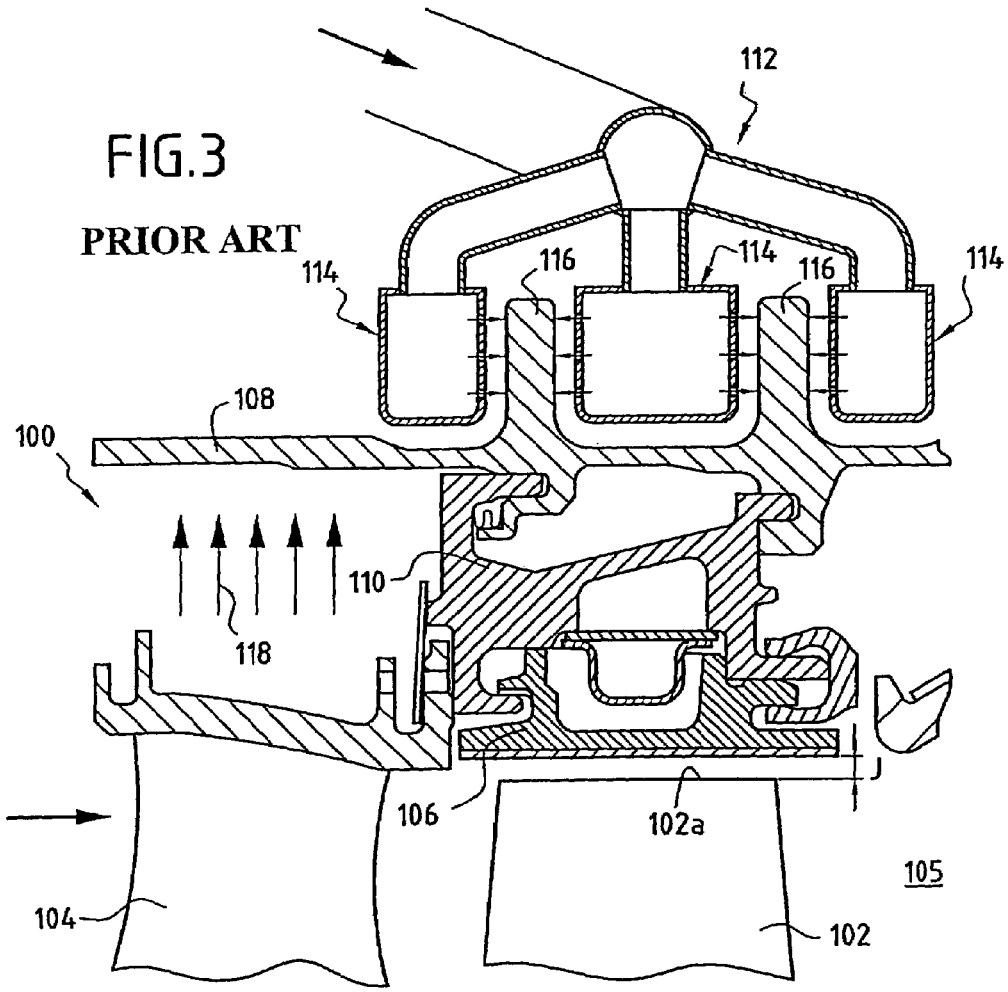

DEVICE FOR AXIALLY HOLDING A RING SPACER SECTOR OF A HIGH-PRESSURE TURBINE OF A TURBOMACHINE

BACKGROUND OF THE INVENTION

The present invention relates to the general field of stator ring support spacers for a high-pressure turbine of a turbomachine. More particularly, the invention provides a device for holding a spacer sector so that said spacer sector is locked axially on the stator, and for providing thermal protection.

With reference to FIG. 3, the high-pressure turbine 100 of a turbomachine consists, in particular, of a plurality of rotor blades 102 disposed in a flow channel 105 for hot gas coming from a combustion chamber (not shown).

A plurality of stator blades 104 that constitute a high-pressure distributor are also disposed in the gas channel 105, upstream from the rotor blades 102 of the turbine.

The rotor blades 102 of the turbine are surrounded by a stator ring made up by a plurality of ring sectors 106. Said ring sectors 106 are secured to a casing 108 of the turbine by means of a plurality of spacer sectors 110.

The ring sectors 106 define clearance J at the tips 102a of the rotor blades 102 of the turbine, which clearance needs to be as small as possible in order to increase the efficiency of the turbine.

To that end, a clearance J tuning device 112 is mounted around the casing 108 of the turbine. Said tuning device 112 consists, in particular, of annular air flow ducts 114 that discharge air onto annular ridges 116 of the casing in order to change their temperature.

Depending on the requirements in terms of tuning the clearance J, varying the temperature of the ridges 116 causes the casing 108 to expand or to contract thermally, which increases or decreases the diameter of the stator ring.

Such an arrangement of the high-pressure turbine presents drawbacks in terms of the casing 108 heating and in terms of holding the spacer sectors 110 axially.

In practice, it has indeed been found that the portion of the casing 108 that is located upstream from the ridges 116 heats due to thermal radiation from the stator blades 104 of the high-pressure distributor.

Said thermal radiation (represented by arrows 118), is caused by the high temperatures of the combustion gas and propagates down the thermal gradient from the stator blades 104 of the high-pressure distributor to the casing. Heating of the casing is particularly detrimental to the lifetime of the turbine.

It has also been found that there is a problem of holding spacer sectors 110 axially. More particularly, spacer sectors on the casing 108 are not held axially upstream. That results in said spacer sectors running the risk of not being held radially.

OBJECT AND SUMMARY OF THE INVENTION

The present invention thus aims at mitigating such drawbacks by providing a device for axially holding a spacer sector of a high-pressure turbine, the device serving both to limit heating of the casing and to hold the spacer sector axially.

To this end, the invention provides a device for axially holding a ring spacer sector of a high-pressure turbine of a turbomachine, said spacer sector comprising an upstream radial wall provided with an outer upstream tongue for being engaged in a corresponding upstream groove of a casing of the high-pressure turbine, and with an inner upstream tongue for being engaged in a corresponding upstream groove of a ring sector, and a downstream radial wall provided with an outer downstream tongue for being engaged in a corresponding downstream groove of the casing of the high-pressure turbine, and with an inner downstream tongue for being secured to the ring sector, said device comprising a piece of longitudinally-extending sheet metal that constitutes a heat shield disposed upstream from the upstream radial wall of the spacer sector against an inner surface of the casing, wherein the piece of longitudinally-extending sheet metal bears axially against the upstream radial wall of the spacer sector and is secured to the casing so as to hold the spacer sector axially.

In that manner, the piece of longitudinally-extending sheet metal, which constitutes a heat shield protecting against thermal radiation from the stator blades of the high-pressure distribution, also serves to hold the spacer sector axially.

Advantageously, the device for holding a spacer sector axially may also have a thermal liner placed between the inner surface of the casing and the piece of longitudinally-extending sheet metal. Said liner enhances protection of the casing against thermal radiation.

Still with the aim of limiting heating of the casing, the device for holding a spacer sector axially may also have a reflective lining disposed on an inner surface of the piece of longitudinally-extending sheet metal.

BRIEF DESCRIPTION OF THE DRAWINGS

Other characteristics and advantages of the present invention appear from the description below, given with reference to the accompanying drawings, which show a non-limiting embodiment. In the figures:

FIG. 1 is a fragmentary longitudinal section view of a high-pressure turbine of a turbomachine showing the location of a device of the invention;

FIGS. 2A and 2B show two possible variant embodiments of a device of the invention; and FIG. 3 is a longitudinal section view of a high-pressure turbine of the prior art.

DETAILED DESCRIPTION OF AN EMBODIMENT

FIG. 1 is a longitudinal section view showing a high-pressure turbine of a turbomachine of longitudinal axis X-X.

The high-pressure turbine 2 consists, in particular, of a plurality of rotor blades 4 disposed in a flow channel 6 for hot gas coming from a combustion chamber (not shown) of the turbomachine.

The rotor blades 4 are disposed downstream from stator blades 8 relative to the flow direction 10 of the hot gas in the channel 6. Said stator blades 8 thus make up a high-pressure distributor and are mounted between upper platforms 9 and lower platforms (not shown).

The rotor blades 4 of the high-pressure turbine 2 are surrounded by a plurality of angular ring sectors 12 which are disposed circumferentially about the axis X-X of the turbine, thereby constituting a circular and continuous surface.

The ring sectors 12 are mounted on an annular casing 14 of the high-pressure turbine, also of longitudinal axis X-X, by means of a plurality of angular spacer sectors 16 that make up a support.

Each spacer sector 16 has an upstream radial wall 18 provided with an outer upstream tongue 20 for being engaged axially in a corresponding upstream groove 22 of the casing 14. The upstream radial wall 18 is also provided with an inner upstream tongue 24 for being engaged axially in a corresponding upstream groove 26 of the corresponding ring sector 12.

Each spacer sector 16 also has a downstream radial wall 28 provided with an outer downstream tongue 30 for being engaged axially in a corresponding downstream groove 32 of the casing 14, and with an inner downstream tongue 34 for securing to the corresponding ring sector 12.

More particularly, the downstream inner tongue 34 of the downstream radial wall 28 is secured to the corresponding ring sector 12 by means of a C-shaped clip 36. Thus, the clip 36 constitutes a holding groove for holding the inner downstream tongue 34.

In order to increase the efficiency of the high-pressure turbine 2, a tuning device 38 is provided, said device making it possible to make as small as possible the radial clearance J left between the inner surface 12a of the ring sectors 12 and the tips 4a of the rotor blades 4.

The tuning device 38 includes an air flow manifold 40 that surrounds the casing 14 of the high-pressure turbine and that is connected to annular ducts 42. Said ducts 42 discharge air onto annular ridges or projections 44 from the casing 14, that extend radially outwards from an outer surface of said casing.

The invention provides a device for holding each spacer sector 16 axially. Such an axial holding device consists in particular of a piece of longitudinally-extending sheet metal 46 that is disposed upstream from the upstream radial wall 18 of the spacer sector 16 against an inner surface of the casing 14.

In addition to its role of holding the spacer sector 16 axially, said sheet metal 46 also constitutes a heat shield. Indeed, the high temperatures of the combustion gas flowing in the channel 6 emit thermal radiation which tends to propagate via the stator blades 8 and via their upper platforms 9 to the casing 14. The sheet metal 46 thus serves as protection against such thermal radiation, which is particularly detrimental to the lifetime of the turbine.

The piece of longitudinally-extending sheet metal 46 of the device for holding the spacer sector 16 axially is a metal part that extends axially over a distance not less than the axial length of the upper support platforms 9 of the stator blades 8. Said length may, however, be adapted depending on requirements, in particular, depending on the length of the high-pressure distributor, in order to provide good protection against thermal radiation coming from the high-pressure distributor towards the casing.

Moreover, the piece of longitudinally-extending sheet metal 46 of the axial holding device bears axially against the upstream radial wall 18 of the spacer sector 16 and is secured to the casing 14 so as to lock the spacer sector axially.

As shown in the figures, at its downstream end 46a, the piece of sheet metal 46 bears axially against the upstream radial wall 18 of the spacer sector 16.

By securing the piece of sheet metal 46 to the casing 14, it is possible to hold said piece of sheet metal 46 against the inner surface of the casing at the same time as holding the downstream end 46a of said piece of sheet metal against the upstream radial wall 18 of the spacer sector 16. One or more systems 48 of the nut-and-bolt type may be used to secure them.

The piece of sheet metal 46 thus being held against the spacer sector 16, said piece of sheet metal is locked in position and cannot move axially. In particular, since the tongues 20, 24, 30, 34 of the spacer sector 16 face downstream, the grooves 22, 26, 32 and 36 with which they are engaged prevent the spacer sector from moving axially downstream. Moreover, the piece of longitudinally-extending sheet metal 46 which bears axially against the upstream wall 18 also prevents the spacer sector 16 from moving axially upstream.

In that manner, the device for axially holding the spacer sector 16 fulfills two functions: firstly, it serves to hold the spacer sector 16 axially and, secondly, it constitutes a heat shield protecting against radiation from the high-pressure distributor.

According to an advantageous characteristic of the invention shown in FIG. 2A, the device for axially holding each spacer sector 16 may also have a thermal liner 50 placed between the inner surface of the casing 14 and the piece of longitudinally-extending sheet metal 46.

Thus, the thermal liner 50 improves the effectiveness of the heat shield constituted by the piece of longitudinally-extending sheet metal 46. For example, it may be made up of fibres (e.g. woven) or of an insulating agglomerate of low thermal conductivity.

According to an advantageous characteristic of the invention shown in FIG. 2B, the axial holding device of each spacer sector 16 may also have a reflective lining 52 disposed on an inner surface of the piece of longitudinally-extending sheet metal 46.

Similar to the thermal liner, the reflective lining 52 that is disposed directly facing thermal radiation coming from the high-pressure distributor improves effectiveness of the heat shield constituted by the piece of longitudinally-extending sheet metal 46. For example, said lining may be made of a ceramic material that has low thermal conductivity and/or high capacity to reflect heat.

It is also observed that the thermal liner 50 and the reflective lining 52 can be used independently from each other or together, in order to reinforce the effectiveness of the heat shield 46.

What is claimed is:

1. A device for axially holding a ring spacer sector of a high-pressure turbine of a turbomachine, wherein said spacer sector comprises:

an upstream radial wall provided with an outer upstream tongue for being engaged in a corresponding upstream groove of a casing of the high-pressure turbine, and with an inner upstream tongue for being engaged in a corresponding upstream groove of a ring sector; and a downstream radial wall provided with an outer downstream tongue for being engaged in a corresponding downstream groove of the casing of the high-pressure turbine, and with an inner downstream tongue for being secured to the ring sector;

the device comprising a piece of longitudinally-extending sheet metal that constitutes a heat shield disposed upstream from the upstream radial wall of the spacer sector against an inner surface of the casing, wherein the piece of longitudinally-extending sheet metal bears axially against the upstream radial wall of the spacer sector and is secured to the casing so as to hold the spacer sector axially.

2. A device according to claim 1, comprising a thermal liner placed between the inner surface of the casing and the piece of longitudinally extending sheet metal.

3. A device according to claim 1, comprising a reflective lining disposed on an inner surface of the piece of longitudinally-extending sheet metal.

4. A device according to claim 1, wherein the piece of sheet metal is secured to the casing by at least one nut-and-bolt system.

* * * * *